Fig. 2.

Nov. 10, 1931.  T. U. WHITE  1,830,974
SELECTIVE SIGNALING SYSTEM
Filed Nov. 14, 1925   8 Sheets-Sheet 3

Fig. 3.

WITNESSES:

INVENTOR
Thomas U. White
BY
ATTORNEY

Nov. 10, 1931.  T. U. WHITE  1,830,974
SELECTIVE SIGNALING SYSTEM
Filed Nov. 14, 1925  8 Sheets-Sheet 4

Fig. 4.

WITNESSES:

INVENTOR
Thomas U. White
BY
ATTORNEY

Nov. 10, 1931.  T. U. WHITE  1,830,974
SELECTIVE SIGNALING SYSTEM
Filed Nov. 14, 1925  8 Sheets-Sheet 5

Fig. 5.

WITNESSES:

INVENTOR
Thomas U. White
BY
ATTORNEY

Patented Nov. 10, 1931

1,830,974

UNITED STATES PATENT OFFICE

THOMAS U. WHITE, OF PITTSBURGH, PENNSYLVANIA, ASSIGNOR TO WESTINGHOUSE ELECTRIC & MANUFACTURING COMPANY, A CORPORATION OF PENNSYLVANIA

SELECTIVE SIGNALING SYSTEM

Application filed November 14, 1925. Serial No. 69,042.

My invention relates to selector systems and particularly to selector systems of the supervisory control type.

An object of my invention is to operate and supervise a number of distant apparatus units from a central point.

Another object of my invention is to insure the correct operation of the apparatus units controlled by the dispatcher.

A further object of my invention is to provide means for automatically sending a code corresponding to the apparatus selected to be operated.

Another object of my invention is to provide means for repeating the transmission of the code until the correct operation has been performed.

A still further object of my invention is to provide means to prevent a repetition of the transmission of the operating code for one control operation after the code has been properly received, until the dispatcher has received the supervisory signal indicative of the change in the controlled apparatus.

A further object of my invention is to provide anti-pumping means which prevents the reclosing of a circuit breaker when it is automatically tripped immediately after being operated to the closed position by the dispatcher.

A still further object of my invention is to provide means for returning the supervisory apparatus to normal only when all operations have been checked as correct.

A further object of my invention is to cause repeated transmissions of the supervisory code signals until such signals are correctly received at the dispatcher's office.

Another object of my invention is to provide means for causing the return to normal of all the apparatus by a circuit which is completed following the correct operation of the controlled unit and the correct reception of the supervisory signals.

A still further object of my invention is to provide means for preventing false operations by reason of accidental crossing of the line wires.

Another object of my invention is to provide means for precluding incorrect operation by reason of an inadvertent false operation by the dispatcher.

There are other objects of this invention which will appear in the disclosure which follows:

More particularly, Figure 1 of the accompanying drawings is a diagram of the dispatcher's panel with individual relay equipment for each dispatcher key.

Fig. 2 is a diagram of the circuit connection for the control sender consisting of a finder and a code-sender at the dispatcher's office.

Figs. 3 and 4 are diagrams of the circuit arrangements for the control receiver at the substation.

Fig. 5 is a diagram of the power switches and individual supervisory equipment therefor.

Fig. 6 is a diagram of the circuit arrangement for the supervisory sender comprising a finder and a code-sender.

Figures 7 and 8 are diagrams of the supervisory receiver equipment at the dispatcher's office.

In practicing my invention, the dispatcher operates a key to cause a finder switch to rotate. The stopping position of this finder switch is determined by the particular key operated.

When the finder switch has stopped, a code-sender is started into operation and a code of 25 impulses with three pause periods is sent out to the distant station, the relative position of the three pause periods among the 25 impulses being the differentiating factor between the code signals. These pause periods are determined by the stopping position of the finder switch.

At the substations, the position of the first pause period selects a relay of a group of relays, each of which control groups of units. The second pause selects a relay of a group of relays, each of which controls one circuit in each of the previously mentioned groups.

A third pause occurs at the 25th pulse. If this pause occurs on the 25th pulse at both stations simultaneously, the circuit prepared as above, is completed to the equipment to be operated. This 25th pause, therefore, acts as a check or guarantee against false operation, since if either station has fallen out of step during the code sending, the pause period will not occur on the 25th pulse at both stations simultaneously.

The supervisory equipment operates in the same manner as above stated to transmit the supervisory signal.

When the dispatcher desires to operate certain power equipment at the substation, he moves one of the keys corresponding to the particular equipment and the operation desired. Associated with each of these keys are pairs of relays, one for tripping and one for closing circuit breakers or starting and stopping the rotation of apparatus as the case may be. When either of these relays is energized, it prepares a circuit over one of its armatures to one of the contacts on the first bank of the finder and over another of its armatures closes a circuit for a stepping magnet.

The stepping magnet is so arranged as to be energized and de-energized intermittently, stepping the wipers over a group of banks around until one of the wipers reaches the particular contact of the one bank previously mentioned. At this point, one of the finder relays finds an energizing circuit over the armature prepared and breaks the circuit of the stepping magnet so that these wipers are now held fixed at this point.

Simultaneously, circuits are prepared for the code-sender relay and the stepping magnet of the code-sender set of wipers and as a result the code-sending wipers are now rotated step-by-step, in a manner similar to the first group. The contacts on one of the banks of the code-sender are connected to contacts on the banks of the finder switches so that, when the wiper of the code-sender reaches the particular contact connected to that at which the finder stopped, a circuit is prepared for momentarily halting the operation of the code-sender and producing a pause period.

Simultaneously with the intermittent energization of the code-sender stepping magnet the line relay, which controls the opening and closing of a line between the dispatcher's office and the substation is energized in a parallel circuit with the relay controlling the stepping magnet of the code-sender switches. When the first long pause period is reached, this line relay remains energized to maintain the circuit closed during this period.

After this pause period, the code-sender switches continue to be stepped around until a contact is reached for a second pause period. The periods, when the pauses occur depend as stated above on the position at which the finder switches stopped. After the occurrence of the second pause period, the wipers continue to step until they reach the 25th contact where the third pause period occurs.

At the control receiver, a relay in the line circuit is intermittently energized by the closing of the circuit previously mentioned. It, in turn, controls a stepping magnet which steps a similar set of wipers step-by-step. At the first pause period, a slow-to-release relay, which had remained energized during the normal opening and closing of the line relay, is now de-energized due to the pause and closes a circuit to one of a group of relays each of which controls a group of circuits, the particular relay energized depending upon the position of the wipers when the first long pause is reached.

Between the first and second pause periods, the stepping magnet is again intermittently energized to step the wipers and at the second pause period the slow-to-release relay is again de-energized and now closes the circuit of one of a group of relays, each of which controls a particular one of the circuits of the groups mentioned above, the particular relay energized depending upon the position of the wiper when this second pause occurs. Although these two operations select the apparatus to be operated, no operation takes place at this time.

The stepping magnet will now continue to step the wipers until they reach the 25th contact, when a third pause occurs. At this point the particular circuit of the particular group previously selected is completed to operate the power equipment selected. This circuit depends, however, on the pause occurring at the 25th contact. Otherwise no operating circuit is completed.

Associated with each power equipment are pairs of relays, one associated with the open condition and a second with the closed conditions or starting and stopping of apparatus. Changes in the power equipment affect these relays in a manner similar to the above-described scheme for starting transmission of impulses from the dispatcher to the substation. Impulses are now transmitted by means of the supervisory code sender to the supervisory receiver, where a particular circuit of a particular group of circuits is closed in a manner similar to that described at the substation and a supervisory indicator is affected. The dispatcher is thus informed of the successful operation at the substation.

Among the novel features disclosed is a circuit arrangement at the supervisory sender whereby supervisory signals are repeatedly sent until correctly received by the supervisory receiver.

Another novel feature is the particular anti-pumping arrangement whereby, as soon as the first impulse from the supervisory sender is received at the dispatcher's office, the code-sender located at the main station is rendered inoperative to repeat the code set up. Specifically, when relay 704 is energized, relay 212 is energized and at its lower armature releases the code-sender to return it to normal.

Another novel feature is the circuit arrangement at the dispatcher's office whereby the master control key must be held closed until the completion of the operation or no operation at all will take place at the substation. In this way, falsifying of the code or accidental operation is prevented.

A further novel feature consists in the circuit arrangements whereby, as soon as the correct supervisory signal has been received at the main station, the supervisory sender is restored to normal and stops repeating the code set up. The circuit for this is completed over the dispatcher's code-sender, supervisory receiver and supervisory sender, all of which must first have correctly operated.

It is understood of course, that but one battery is used at each station. The lines connecting the main station and the substation are so arranged that, should any line accidentally cross the other, no false operation takes place. This is insured by reason of the particular circuit arrangement of the battery at each station.

In order to facilitate the understanding of this invention, a brief description of the function of each of the mechanisms, with its relationship to the operation, will now be given.

A plurality of individual operating keys, such as K—1, K—2, K'—1, K'—2, etc., determine which of the code-controlling relays 5, 9, 5', 9', etc., is to be energized. The groups of keys K—1, K—2 and K'—1, K'—2, are individual to the circuit breakers or any other remote apparatus units to be controlled. The master control key K—3, upon operation, completes an energizing circuit for the relay 2, which, in turn, through its armature 2a, completes an energizing circuit for the individual code-control relay, such as 5, 9, etc., through the contacts of the operated individual closing key, such as K—1. The master key is so connected in the circuit that it must be maintained closed during operation and, if opened before the desired operation has taken place, will prevent such operation. This will be described in more detail hereinafter. The key K—4 normally completes a circuit for the alarm signaling devices 25 and 26 over the front contract and armature 725 of relay 726 which, in turn, is energized by the first supervisory signal so that the dispatcher is thus advised of an incoming supervisory signal. By operation of the key K—4, the dispatcher can open the locking circuit of the relay 726 and stop the alarm after he has thus been advised. The key K—5, when operated, acts as a by-pass for putting ground on conductor 6 independent of the ground from armature 2a.

Associated with each of the keys on the dispatcher's panel are pairs of relays, such as relays 5 and 9, the one for tripping operation, the other for closing; or starting and stopping, respectively. Each of these relays has three armatures, one for a self-locking circuit, one to close a circuit for a stepping magnet 208 which controls a set of wipers, A, .. D, and a third armature which is connected to one terminal of one of the wipers at one point and to a relay 211 at the other.

The finder includes a relay 211 which is connected to the third armature just mentioned and is energized when the wiper on the finder switch reaches the corresponding contact. Through one contact, this relay transfers the circuit of the finder switch stepping magnet circuit therefrom to the start relay 214 on the code-sender. In this way, the finder switch is rotated until it comes opposite the last-mentioned contact on its bank where it is stopped, this being the position associated with the particular key operated by the dispatcher.

The relay 209 is so related to the stepping magnet 208 that it causes the circuit of the stepping magnet 208 to be opened when the former is energized, and the stepping magnet, upon de-energization, opens the circuit of the relay 209, which, when it is de-energized, again closes the circuit of the stepping magnet, and so on. In this way, the stepping magnet is intermittently energized and de-energized to step the wipers.

The relay 212, through its lower armature, controls battery to the stepping magnet and is energized upon the receipt of the first supervisory impulse to remove battery from the stepping magnet and thereby prevent any further operation of the finder.

At the code-sender, the relay 214 receives battery, as explained before, when the relay 211 is energized as a result of the finder wipers having reached the particular position mentioned. The relays 214, 215, and 216 prepare the code-sender for operation.

The relay 216 causes the de-energization of the relay 220, which removes direct battery from the stepping magnet 218 in a buzzer circuit and connects battery to the stepping magnet to cause it to operate intermittently, as in the case of the first-mentioned stepping magnet. In this case, the relay 217 coacts with the stepping magnet as does the relay 209 with relay 208. The relay 217 and the relay 219 are connected in parallel and, as the relay 217 is intermittently energized and de-energized, the relay 219 is similarly intermittently energized and de-energized, and since 219 controls the opening and the closing of the line, impulses are transmitted over the line. The relays 221, 222 and 223 control the pause periods, of which more follows.

As already mentioned, the bank A has each contact associated with a different key so as to determine the stopping point. The bank B is divided into groups, each group being connected to a different contact on the bank F. The banks C and D represent units of each of the above-mentioned groups and each contact of a group is connected to a different contact on the bank F, similar contacts of different groups being joined.

As the wipers of the bank, E to H rotate, they reach the contacts connected to the particular group on bank B where wipers A to D stopped. The first pause period occurs at this point, after which the wipers continue to rotate until they reach the contact on the bank F connected to the particular contact on the bank C, at which the wipers are stopped and the second pause occurs. A third pause always occurs on the twenty-fifth contact.

At the control receiver, 300 is a line relay energized by the impulses aforementioned. At its armature 300a, this relay controls the circuit of the stepping magnet 301 and at its armature 300b, the energization of relay 302. Relay 302, at its armature 302a, opens the buzzer circuit of the stepping magnet and at its armature 302c, closes the circuit for the slow-to-release relay 303.

Relay 401 and its associated relays control groups of circuits. Relay 406 and its associated relays control particular circuits of each of these groups. The first pause period heretofore mentioned will cause the energization of either relay 401 or one of its associated relays. The second pause period will cause the energization of either relay 406 or one of its associated relays, and these two together will determine the particular operating circuit.

It is, of course, necessary to prevent the operation of the relay 406 or its associated relays until a pause period occurs. This is accomplished by the energization of relay 308, which, in turn, controls relays 306 and 307. Since the circuits for relays 401 or 406 or their associated relays are closed over the back contacts and armatures of relays 306 or 307 now held open, these circuits cannot be completed until a pause period causes the de-energization of either of these relays.

It is also desirable, after the selection has been made, to prevent the operation of the particular mechanism selected to be operated until it is certain that it has been correctly selected. This correct selection is determined if the wipers E to H and I to L reach the 25th contact simultaneously. The relay 303, through its armature 303a, holds the operating circuit of the selected mechanism open until the 25th impulse and, if this totalizes properly, the third pause causes the relay 303 to de-energize and the operating circuit is closed.

The relay 304 functions to lock the particular relays of the series of 401 and 406 energized, through its lower armature 304a.

The relay 403 functions to prevent any other group relay to operate after the relay 401 has operated to select the particular group. This is accomplished by opening the contacts controlled by relay 403. The relay 305 functions to prevent any other final selecting relay to operate after the relay 406, or one of its associated relays, has operated.

The mechanism of the supervisory sender, consisting of the finder and code sender and the supervisory receiver is identical with that already described and need not be repeated here.

The relay 704 of the supervisory receiver performs, in addition to the function of locking one of the group relays 806, or its associated relays, that of energizing the relay 212, which, as has already been explained, removes the battery from the finder switch stepping magnet and prevents further operation of the code sender for sending the code previously set up.

A better understanding of the invention will be had from the following detailed description of the operation taking place when the dispatcher closes the key to operate desired mechanism. As disclosed in the drawings, the circuit breakers at the substation are in closed position.

Let it be assumed that the dispatcher desires to trip circuit breaker No. 1 at the substation. The closed condition of breaker No. 1 is indicated to the dispatcher by the illuminated red lamp on the dispatcher's panel, the circuit being from battery, the back contact of armature 1a, through red lamp of breaker No. 1, to ground.

The dispatcher will now close the trip and master control key. As a result, a circuit will be completed for the relay 2 from battery, winding of relay 2, armature 3b, through the closed contact of master control key, to ground.

As a result of the energization of relay 2, a circuit will be completed from battery, thru windings 2 and 3 in series, armature 2b, armature 4a to ground. This circuit will not be effective at this time by reason of the short circuit over 3b.

Another circuit will be completed from battery, armature 1a, relay 5, closed contact of the trip key of breaker 1, armatures 3a and 2a, to ground.

Relay 5 will be energized and close the contacts of its armatures 5a, 5b, and 5c. A locking circuit for relay 5 is now completed from battery, armature 1a through winding 5, armature 5c over line 6 to armature 3a, armature 2a, to ground. Closing of the contact of the armature 5b places the ground of line 6 on line 7. The closing of the contact of armature 5a prepares a circuit from a contact of bank A, Fig. 2 to relay 210.

Armature 5b, as stated, places ground from line 6 to line 7 thereby closing the circuit for the stepping magnet 208, from ground through battery, armature 212a, armature 211b, armature 210b, armature 209a, stepping magnet 208, line 7, armature 5b, line 6, armature 3a, and armature 2a to ground.

Energization of the stepping magnet 208 prepares the pawl for stepping the wipers of banks A to D. As a result of the energization of relay 208, a circuit is completed from battery, through armature 212a, armature 211b, armature 210b, front contact of armature 208a, winding of slow-to-release relay 209, and armature 212b, to ground.

As a result of the energization of relay 209, the circuit for the stepping magnet 208 is opened at armature 209a. Stepping magnet 208 is de-energized, stepping the wipers of banks A to D from the first contact to the second contact. Simultaneously, the circuit just traced for the relay 209 is opened at the armature 208a. After an interval of time, 209 is de-energized and again closes the circuit for the stepping magnet 208. In this manner stepping magnet 208 is intermittently energized and de-energized to cause the wipers of banks A to D to be stepped from contact to contact. When the wiper on bank A reaches its second contact, a circuit is completed from battery, winding of the relay 210, armature 5a, the second contact of bank A, through the wiper of the bank A, to ground.

Energization of relay 210 moves its armature 210b and 210d from front to back contacts and closes the contacts of armatures 210a and 210c. The circuit for the stepping magnet 208 is opened at the armature 210b and the circuit for the relay 214 is closed from battery, armature 212a, armature 211b, armature 210b, relay 214, wiper of bank E to ground.

Energization of relay 214 closes the front contact of its armature and causes the energization of relay 215 from battery, winding of relay 215, through armature 214, to ground. Energization of relay 215, energizes relay 216 over a circuit from battery, winding of relay 216, the armature 215b, to ground. Energization of relay 216 opens the circuit for the relay 220 at armature 216a and closes the contact of its armature 216b, which has no effect at this time.

Another result of the energization of relay 210 is to close the circuit for the relay 217 from battery, through the armature and closed contact of the stepping magnet 218, relay 217, armature 210c, to ground. A parallel circuit energizes line relay 219 over armature 215a.

One effect of the de-energization of relay 220 is to close the circuit for slow-to-release relay 221 from battery, armature 220b, through the winding of slow-to-release relay 221, to ground at armature 223a. Energization of relay 221 causes the energization of relay 222 over a circuit from battery, winding of relay 222 through the closed contact of the armature of relay 221, to ground.

Energization of relay 222 closes a circuit for the stepping magnet from battery, armature 220b, wiper of bank G, stepping magnet 218, armature of relay 217, armature of relay 222 energized, through armature 223b, to ground.

The stepping magnet 218 moves its pawl to prepare for the stepping of the wipers of the banks E to H. Simultaneously, 218 opens the circuit for the relay 217 and line relay 219, previously traced, at its armature contact. De-energization of relay 217 in turn opens the circuit for the stepping magnet 218 at its armature and the wipers of banks E to H are moved one step. As a result of the de-energization of relay 218, the contact of its armature is again closed and relays 217 and 219 are again energized.

This cycle of events is then repeated and will continue until the wiper of bank F reaches its contact 3, which is connected to the first group of contacts on the bank B, at which point, it will be remembered, the finder wipers have stopped.

At this point a circuit is completed from battery, through the winding of relay 223, wiper of bank F, bank B, line 7, armature 5b, line 6, armature 3a, armature 2a, to ground. Energization of relay 223 will open the circuit for the stepping magnet 218 at armature 223b and the circuit for the slow-to-release relay 221 is opened at the armature 223a. The de-energization of slow-to-release relay 221 will, after an interval of time, open at its armature contact, the energizing circuit for the relay 222. As a result, relay 222 will be de-energized and its armature will fall to its back contact.

A circuit will now be again completed for the stepping magnet 218 from battery, armature 220b, bank G and its wiper, winding of the stepping magnet 218, armature of relay 217, armature of relay 222, through the armature 223b, to ground.

Energization of stepping magnet 218 prepares its pawl for stepping the wipers E—H another step. Simultaneously, as already traced, it opens the circuit for the relay 217, which, after an interval of time, will be de-energized and will, at its armature, open the circuit of the stepping magnet 218 to cause wipers to move from its contact 3 to the next contact on the bank. The circuit for the relay 223 will now be opened and the armature 223b will again close at its back contact, and the circuit over armature 223a will again energize relay 221, which, in turn, will energize relay 222 to again prepare a circuit for the stepping magnet 218, as originally traced.

Thus far, the operation has been traced through the transmission of the first group of impulses and first pause period. During the pause period, it will be noted that stepping magnet 218 is de-energized. Relays 217 and 219, therefore, remain energized and the line between the two stations is closed. The stepping magnet 218 now continues to be intermittently energized and de-energized in a manner as already described, until the wiper of the bank F reaches a contact on its bank which is connected with the 2nd contact on the bank C, at which the finder wiper has stopped.

It will be remembered that at the beginning of the first pause period, a circuit was completed from ground, through the wiper of bank B. This same circuit from battery is now completed through relay 223, contact of bank F, to wiper of bank C, over the armature 210d, to ground.

Again the circuit of the stepping magnet 218 is opened at the contact of the armature 223b and the circuit for relay 221 is opened at the contact of armature 223a. As a result, the circuit of relay 222 is opened. Since relays 221 and 222 are slow-to-release relays, a period of time lapses before 222 is de-energized to move its armature to the back contact and again close the circuit of the stepping magnet 218.

However, after an interval of time this action occurs and relay 218 is again energized from battery, armature 220b, through the wiper of bank G, stepping magnet 218, armature of relay 217, armature of relay 222 de-energized, over armature of 223b, to ground.

Energization of the stepping magnet 218 again prepares its pawl for stepping the banks E to H and simultaneously opens the circuit for the relay 217. After an interval of time, relay 217 is de-energized and at its armature opens the circuits for the stepping magnet 218 which, on its de-energization, causes the wipers of the banks to step to their next contacts and open the circuit of the relay 223. De-energization of relay 223 again closes a circuit for the energizations of the relay 221, which, in turn closes a circuit for relay 222 and the circuit for stepping magnet is again closed over the original circuit traced. The stepping continues to function until the 25th contact is reached. The circuit for the stepping magnet 218 is then opened at bank G. Relays 217 and 219 remain energized and a third pause period results.

The operations thus far traced have produced, due to the operation of the key by the dispatcher, a series of impulses transmitted over the main line 225, due to the intermittent energization and de-energization of relay 219 with 217. There occurred a first pause period during which the line was held closed for a period longer than the ordinary impulse periods, followed by a second series of impulses, a second pause period, a third group of impulses and a third pause at the 25th contact. The effect of these impulses at the substation will now be described.

Upon the energization of relay 219 at the dispatcher's office, the line is closed, as already described, to energize line relay 300 over a circuit from battery armature 219a line 225, through winding of relay 300, to ground.

As one result of the energization of relay 300, a circuit is completed for the stepping magnet 301, from battery, through stepping magnet 301, through the armature 300a to ground.

A second result of the energization of relay 300 is to energize the slow-to-release relay 302 from battery, winding of slow-to-release relay 302, over armature 300b, to ground.

Energization of the stepping magnet 301 prepares its pawl to step the banks I to L. Upon the opening of the line 225, relay 300 is de-energized and opens the circuit for the stepping magnet 301 at its armature 300a as a result of which the wipers of banks I to L are stepped from the first contact to the second contact. A circuit is completed from battery and through winding 303 armature 302c, the wiper of bank J, to ground. Energization of relay 303 creates a locking circuit for itself at its armature 303b and opens a circuit at its armature 303a. This is the operating circuit held open until the 25th impulse period to guarantee operations only of correctly selected apparatus.

Another effect of the de-energization of relay 300 is to close a circuit for the relay 308 from battery, winding of relay 308, armature 302b, through the armature 300b to ground. As a result of the energization of relay 308, a circuit is completed for the energization of relays 306 and 307 over the armatures 308b and 308a respectively.

As a result of wiper of bank I stepping to its second contact, a circuit is completed from battery, through winding 304, through the wiper of bank I to ground. The closing of the contact of the armatures of relay 304 has no effect at this time. When selection has been made, its contacts will act as a locking circuit.

Upon the arrival of the next impulse, relay 300 is again energized to energize the stepping magnet 301 as traced. When the line is open, relay 300 is de-energized and simultaneously stepping magnet 301 is de-energized stepping thereby the wipers I to L to their second contact.

Upon receipt of the first impulse and the consequent energization of relay 302, as already described, a circuit was completed from battery, winding of relay 308, armature 302b, through the wiper of bank K, to ground. As already explained, relays 307 and 306 are energized as a result to hold their armature contacts open. As soon as the wiper K moves from its first contact to its second contact, this circuit for relay 308 is opened at the wiper of banks K and during the energizing periods of the line, the circuit for relay 308 is also opened at the armature 300b. Relays 306 and 307 are now, however successively energized over the contacts of bank K but due to the relatively rapid movement of the bank, these slow-to-release relays do not de-energize during their open circuit periods.

When the first pause period occurs, the line, as previously described, remains closed and relay 300 is therefore held energized, as a result of which stepping magnet 301 is energized. The banks are not stepped during this period and one of the relays 306 and 307 de-energizes after an interval of time, due to the fact that its circuit is opened at the bank K.

Since, from the illustration, it is assumed that the first pause will occur at the third contact, relay 306 will be energized over the third contact of bank K and, the circuit for relay 307 is opened at bank K.

It is understood, of course, that during the normal transmission of the impulses, the slow-to-release relays 306 and 307 do not de-energize during the small interval of time during which their circuits are opened. As a result of the de-energization of relay 307, a circuit is completed from battery, through winding of relay 401, contact closer 400, line 310, wiper of bank L, armature 305a, armature of relay 307, armature 302a, through the wiper of bank I, to ground. Energization of relay 401 closes all the contacts of its group 402. There results also a locking circuit for relay 401 from battery, winding of relay 401 through the first contact of bank 402, the armature 304a to ground.

A circuit is also completed from battery, through the winding 403, through the second contact of the contact group 402, to ground. Energization of relay 403 opens the contacts of the group 400 to prevent energization of any other of the group relays 404 or 405.

At the end of the first pause period, the line circuit is opened to de-energize relay 300, which, in turn, de-energizes the stepping magnet 301 to the wipers I and L are stepped to the next bank contact, as a result of which relay 307 is again energized to open the contact at its armature.

The second series of impulses now follow, as a result of which the wipers of the banks I to L are stepped until the second pause period takes place. At this time, the same operation is repeated as took place at the first pause period, either relay 306 or relay 307 being de-energized after an interval of time to close the circuit at its armature.

The wiper of bank L has, by this time, reached the second group of wired contacts shown. In the illustration described, the second pause period takes place at the 15th contact and the circuit is completed, as described before, from battery, through winding of relay 406, wiper of bank L, its 15th contact armature 305a, armature of relay 307, armature 302a, through the wiper of bank I, to ground. Energization of relay 406 closes, through its armature, the three contacts shown. As a result of the energization of relay 406, a locking circuit is prepared from battery, through winding of relay 406 third armature contact of the relay 406, through the armature 304a to ground.

As another result of the energization of relay 406, a circuit is completed from battery, through the winding of relay 305, then the second armature contact of relay 406 to ground. Energization of relay 305 opens the contact of its armature 305a and prevents any further group selection, since, as was observed from the previously traced circuits, all group selections were energized over this contact. Relay 305 closes a locking circuit for itself from battery, winding of relay 305, through armature 305b, through armature 304b, to ground.

At the end of the second pause period, relay 300 is de-energized to de-energize stepping magnet 301 and the wipers of banks I to L are stepped to the next contact, as a result of which, relay 307 is again energized over the bank K. The stepping magnet now continues to move the wipers until the third or last pause period which, as already described, occurs at the 25th contact.

One of the important features of this invention is this 25th impulse which insures against false operation or in other words, acts as a check for correct selection. If, for any reason, the wipers I to L fall out of synchronism with the wipers E to H during the stepping from the 1st to the 25th contact and, therefore, fail to reach the 25th contact at the same time, no operation will take place, as will be seen from the following description. Instead, the code-sender at the dispatcher's office will re-transmit its code and will continue to do so, until the switches, during a cycle, that is, during a period when the wipers move from the 1st to the 25th contact, do step in synchronism, and the two sets, E to H and I to L reach the 25th contact simultaneously.

For the present, it will be assumed that both wipers E to H and I to L reach the same contact simultaneously. As already described, a third pause period occurs at the dispatcher's code sender when the wipers E to H reach the 25th contact and relay 219 is held energized.

If now wipers I to L are on their 25th contacts, relay 303 will be de-energized when the wiper of bank J passes from the 24th to the 25th contact. Since relay 303 is a slow release relay it will not have time to de-energize unless a pause occurs at this time when its circuit is open. As a result of the de-energization of relay 303, a circuit is completed from battery, relay 500 last contact of the group 402, over line 407, contact of the group controlled by the relay 406, armature 303a, wiper of bank J through its 25th contact, to ground. As a result of the energization of relay 500 over the circuit just described, a circuit is completed from battery, winding of relay 501, through armature 500a to ground.

Energization of relay 501 closes the circuit for the relay 502, which trips the circuit breaker No. 1. This completes the operation performed by the dispatcher.

The operations now to be described are the supervisory operations which take place as a result of the tripping of the circuit breaker. The operations to be described, it is understood, function in the same manner whether the circuit breaker opens as a result of the dispatcher's operation or by automatic means. Normally, the relays 503 and 504 are energized in series over a circuit extending from battery, winding of relay 504, slow-to-release relay 503, armature 504b, armature 505a, and armature 506b to ground, relay 504 having been previously energized over a circuit to be traced later.

As a result of the tripping of the circuit breaker relay 506 is energized. As a result the circuit for relays 503, 504 traced above is rendered inoperative by placing potential between 503 and 504 from battery, armature 500b, armature 506c, to the mid-point between relays 503 and 504. Potential brought to this point causes, as a result, the de-energization of relay 504. Since relay 503 was energized in a circuit over the armature 504b, de-energization of relay 504 will result in the de-energization of relay 503.

As a result now of the de-energization of relay 503, a circuit is momentarily completed from battery, winding of slow-to-release relay 505, armature 504c, armature 506b, to ground. A locking circuit is formed for the relay 505 over its armature 505b.

As a result of the de-energization of relay 503, previously described, a circuit is completed from battery to armature 611b, armature 610a, armature 609a, winding of stepping magnet 608, armature 503a, to ground. Stepping magnet 608 is energized over this circuit to prepare its pawl to move the wipers of banks M to P from the first to the second contact. As a result of the energization of magnet 608, a circuit is closed for the relay 609 from battery, through armature 611b, armature 610a, closed contact of the armature 608a, winding of slow-to-release relay 609 and armature 611c, to ground.

As a result of the energization of relay 609, the circuit of the stepping magnet 608 is opened at the armature of relay 609 and the pawl of the stepping magnet 608 steps the wipers from the first to the second contact.

As already described in the case of the finder switch at the dispatcher's office, this cycle will continue until the wipers reach the contact, in this case, the second at which point a circuit will be completed from battery, winding of relay 610, armature 504—a through the wiper and bank P, to ground. As a result of the energization of relay 610, the circuit for the stepping magnet 608 is opened at the armature 610a, and the wipers are stopped at this point.

Another result of the energization of relay 610 is the energization of relay 614 over a circuit from battery, through armature 611b, armature 610a, winding of relay 614, wiper of bank R, to ground. Energization of relay 614 results in the energization of relay 615 over its armature, which, in turn energizes relay 616. Energization of relay 616 forms a locking circuit for the relay 610, independent of its formerly traced circuit, from battery through winding of relay 610, and armature of relay 616, to ground. Another result is the opening of the energizing circuit of relay 620 at the armature of relay 616.

As a further result of the energization of relay 610, an energizing circuit is closed for the relay 617 from battery through closed contact of the stepping magnet 618, winding 617, and armature 610b, to ground. Line relay 619 is closed over a parallel circuit including the armature 615a.

Relay 622 is energized over a circuit from battery, through armature 620b, winding of slow-to-release relay 622 and armature 623a to ground. Energization of relay 622 closes an energizing circuit for the relay 621. A circuit is now completed for the stepping magnet 618 from battery, through armature 620b, wiper of bank T, stepping magnet 618, armature of relay 617, armature of relay 621 energized, armature 623b, to ground.

The energization of stepping magnet prepares its pawl for stepping the banks R to U, as already described, and simultaneously opens the circuits for relays 617 and 619 at the contact of its armature. De-energization of relay 617 opens, at its armature, the circuit of the stepping magnet 618.

The code-sender has now been sufficiently described to show its similarity to the code-sender at the dispatcher's office. As shown in that case, the line relay 619 will be intermittently energized with the stepping magnet 618 until the wiper of the banks reaches the contact connected to the first group at O, at which point the circuit is completed for the relay 623 for the first pause period and the circuit for the stepping magnet is opened. As a result of the energization of relay 623, the circuit for relay 622 is opened at armature 623a and after an interval of time the relay 622 is de-energized to de-energize relay 621. This results in again completing an energizing circuit for the stepping magnet 618, which, in turn, opens the circuit for the relays 617 and 619, which, in turn, open the circuit for the stepping magnet 618 and the wipers R to U continue to step until the second pause point is reached, then they perform the same cycle and continue to the 25th contact for the third or final pause point. The intermittent energization of relay 619 opens and closes the circuit of line relay 700 from battery, armature of relay 619, line 625, winding of relay 700 to ground.

As in the case of the received impulses at the substation, energization of relay 700 causes the energization of relay 702 as well as the energization of the stepping magnet 701. Upon the opening of the line circuit, de-energization of relay 700 will cause de-energization of stepping magnet 701 and results in the wipers of banks V to Z stepping from the 1st to the 2nd contact.

Relays 706 and 707 are energized over the bank Y. Relay 703 is energized over armature 702d and the bank X and relay 704 is energized over the bank V, all in a manner similar to that described in the case of the operation at the substation receiver.

As the wipers V to Z are moved step-by-step over their contacts, energizing circuits for relays 706 and 707 are intermittently closed and, since these relays are slow to release, they will hold their circuits open at their armatures. Relay 702, being a slow-to-release relay, does not de-energize during the periodic de-energization periods of relay 700, although its circuit is open at the armature of relay 700. When, however, a pause period is reached, relay 700 remains energized for a period longer than usual, the wipers do not step and either relay 706 or 707, is de-energized, depending upon the position of wiper of bank Y.

De-energization of relay 707 in this case will close a circuit which extends from battery, winding of relay 801, first contact of the group 800 controlled by relay 803, wiper of bank Z, armature 705a, armature of relay 707, armature 702a, wiper of bank V, to ground. This will result in the selection of a group of circuits 802.

Energization of relay 801 closes the contacts of the first group selection. Relay 801 simultaneously forms a locking circuit for itself, from the battery, winding of relay 801, first contact of bank 802, armature 704a, to ground.

Relay 803 is energized over a circuit from battery, to winding 803, second contact of the group of circuits 802, to ground. Relay 803 energized opens its armature contacts to prevent any further group selection.

As the continued impulses now arrive over the line, the banks V to Z continue to be stepped until the second pause period is reached. At this point, the same cycle of operations take place as has already been described in the case of the first pause period, except that the wiper bank Z, instead of being connected to the first series of group selecting relays, such as 801, is now connected to the second group and a circuit is completed for the relay 806, similar to the circuit described for the relay 801. Relay 806 also completes a locking circuit for itself similar to the locking circuit described for the relay 801. Impulses now continue to come over the line until the wipers have reached the 25th contact.

As already described in the control operation, an essential feature of the invention relates to the fact that unless the wipers of the supervisory code sender reach the 25th contact at the same time that the wipers V to Z of the supervisory receiver reaches their 25th contact, no operation will take place and the supervisory code sender will merely repeat its code until both sets of wipers reach the 25th contact simultaneosly. This, as already described in the case of the control operation, will guarantee correct supervisory signaling.

In order to describe the present operation completely, it will be assumed that both groups of wipers reach their 25th contact simultaneously. A pause period similar to the first two pause periods take place at this time. The circuit for the relay 703 is opened when the wipers of bank X passes from the 24th to the 25th contact. After an interval of time, its armature 703a will be released to close a circuit from battery, winding of relay 1 to contact of the group 802, line 807 contact of the group-selecting relay 806, armature 703a, 25th contact, wiper of bank X, its wiper to ground.

Relay 1 forms a locking circuit for itself over armature 1b and at its armature 1a opens the circuit for the supervisory red-lamp, opens the locking circuit for the relay 5, described previously, and closes the circuit for the white lamp thereby indicating to the dispatcher the correct operation of the circuit breaker at the substation.

This completes the supervisory operations. The restoring operations which take place as a result of the correct transmission of an operation and correct receipt of the supervisory operation will now be described.

Figure 1:
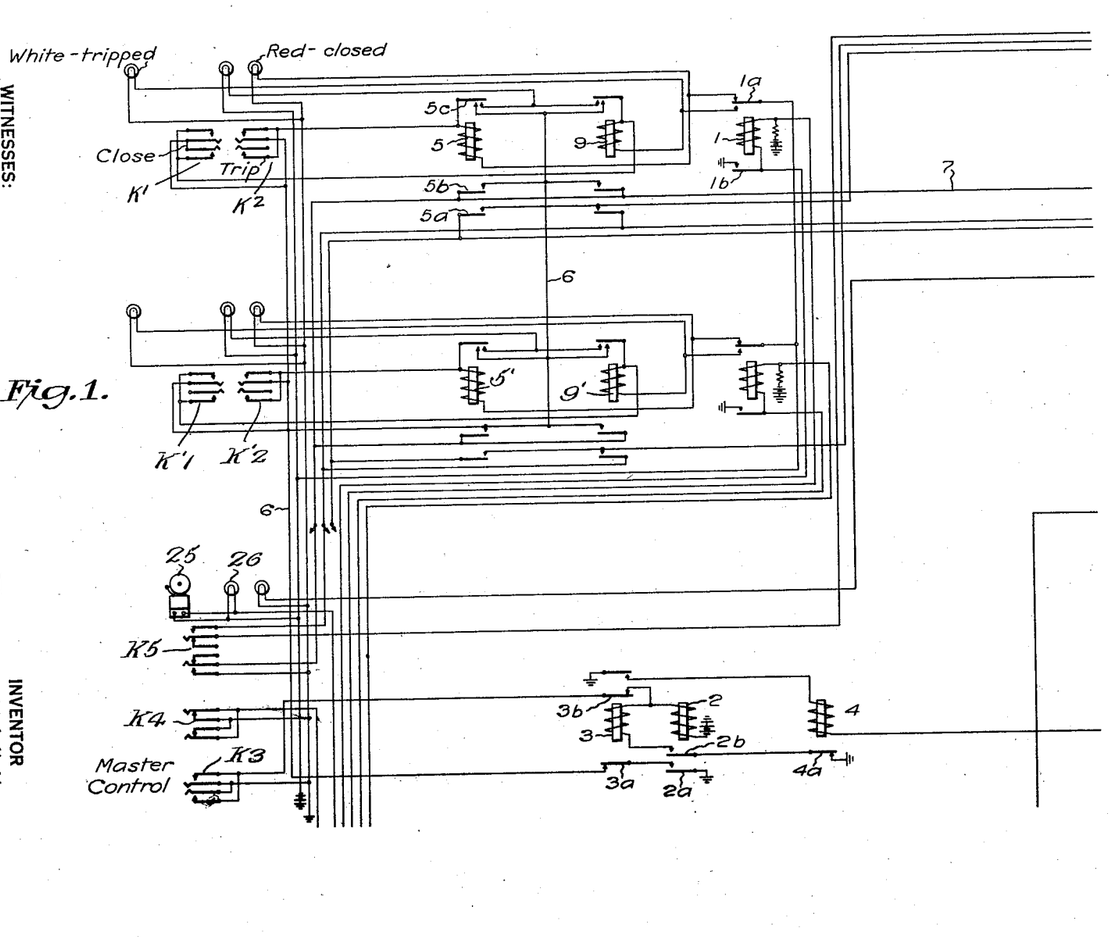
Figs. 1, 2, 7, 8 are diagrammatic views of the circuit connections at the dispatcher's office.
Figure 2:
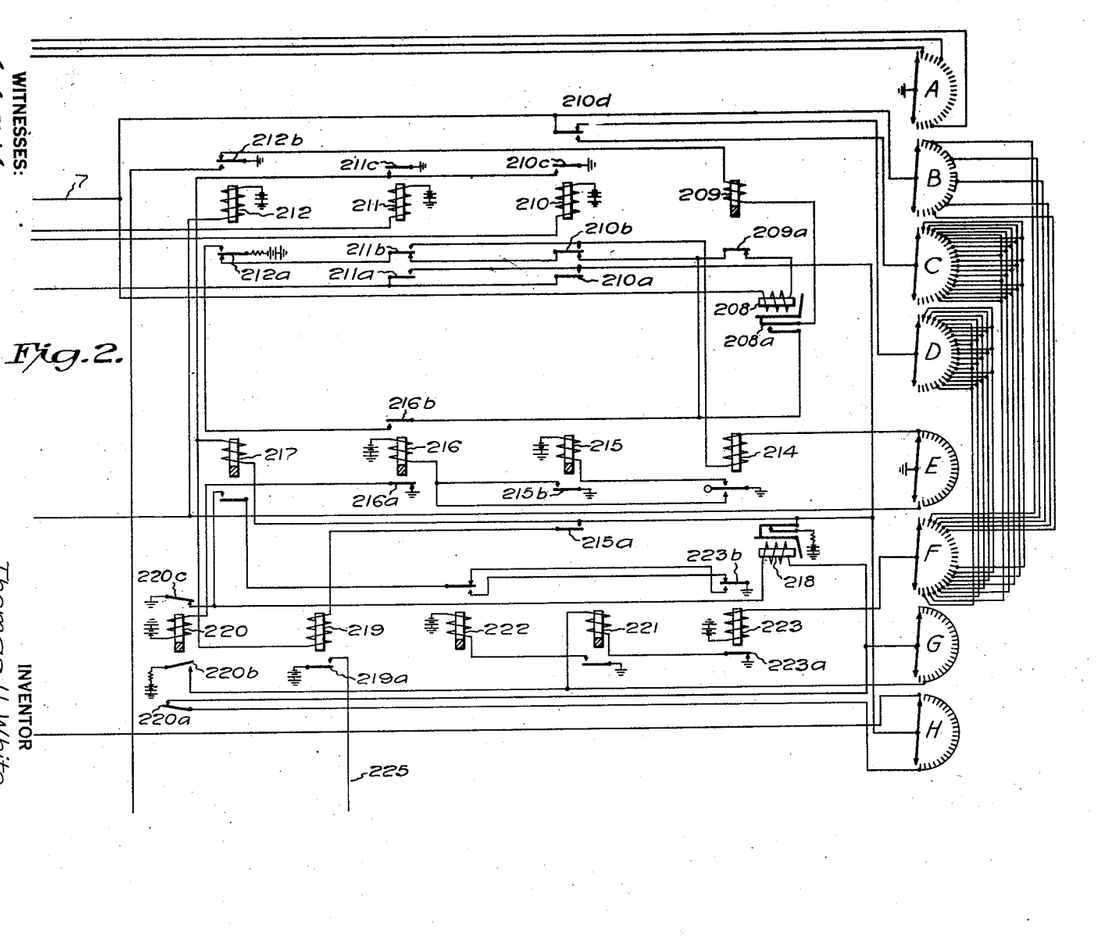
Figure 3:
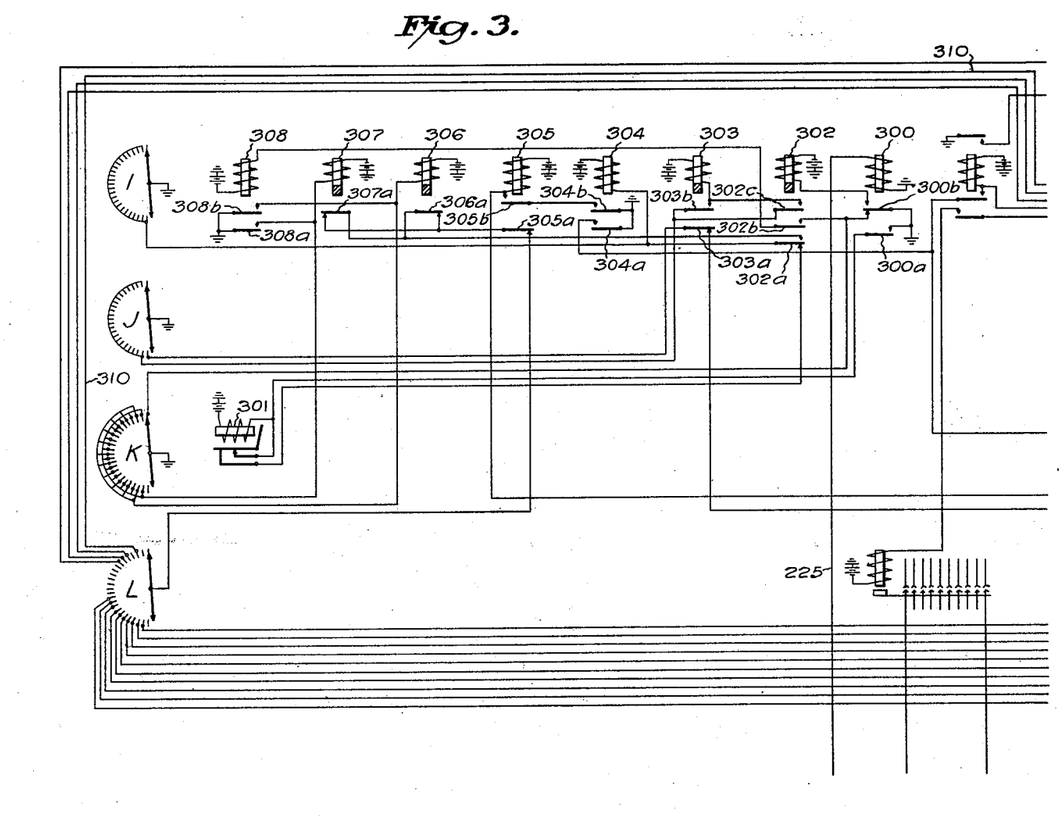
Figs. 3, 4, 5, 6 are diagrammatic views of the circuit connections at the substation.
Figure 4:
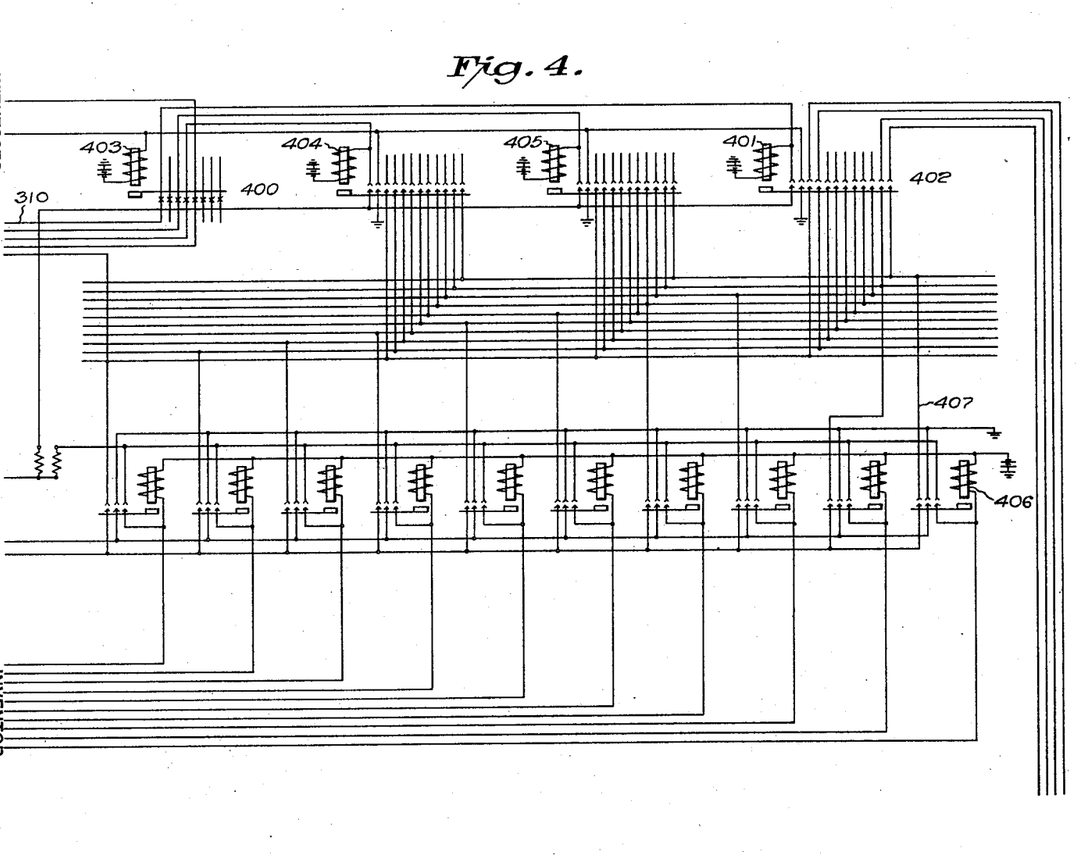
Figure 5:
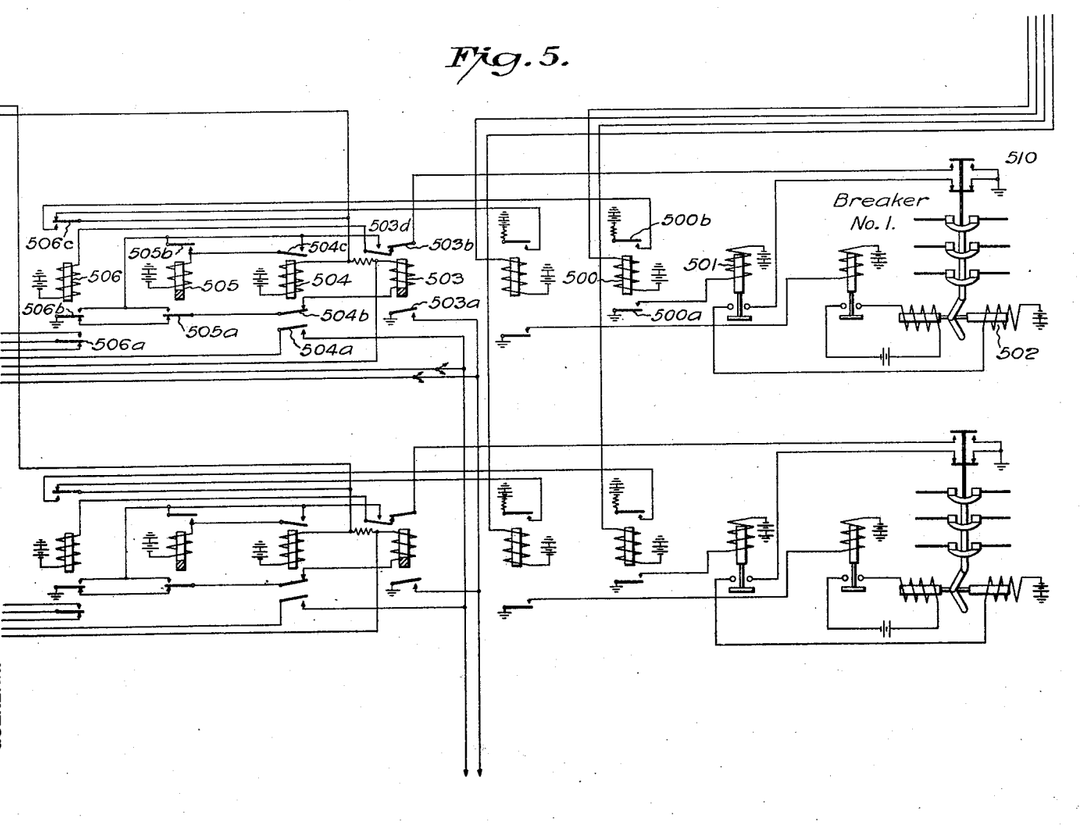
Figure 6:
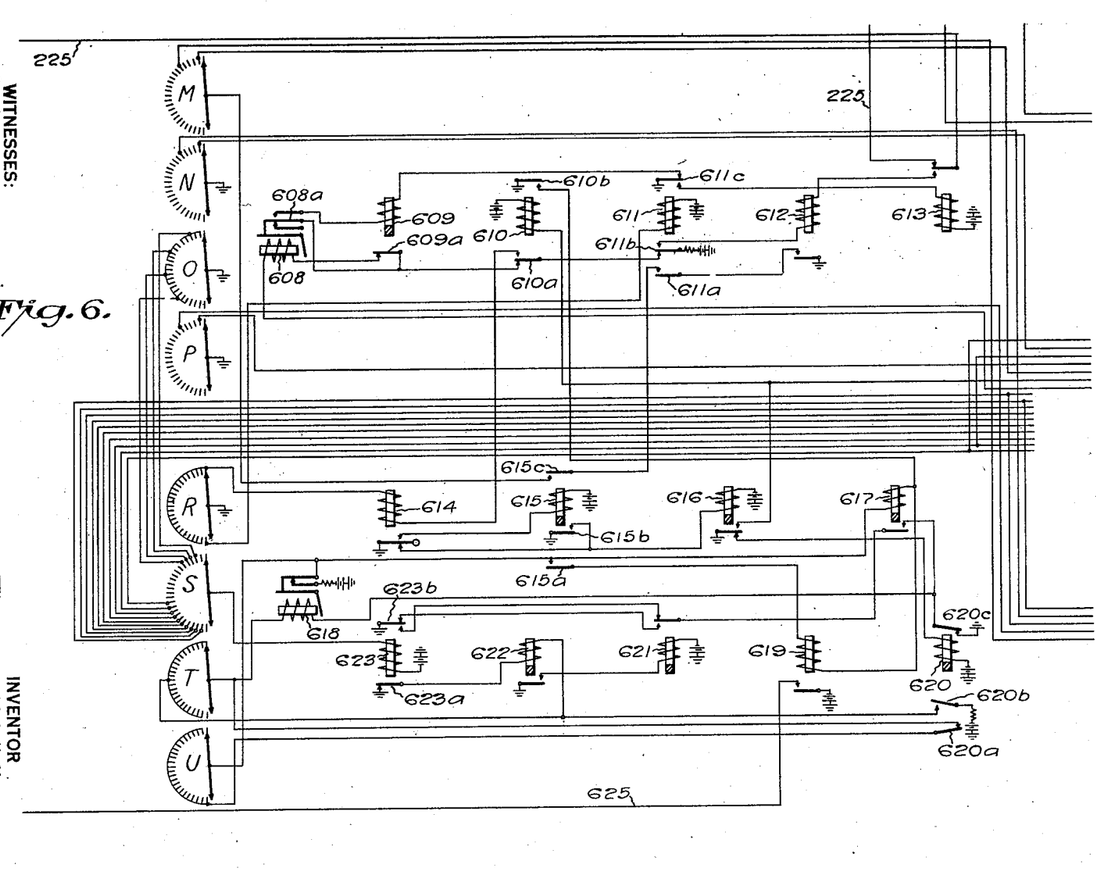
Figure 7:
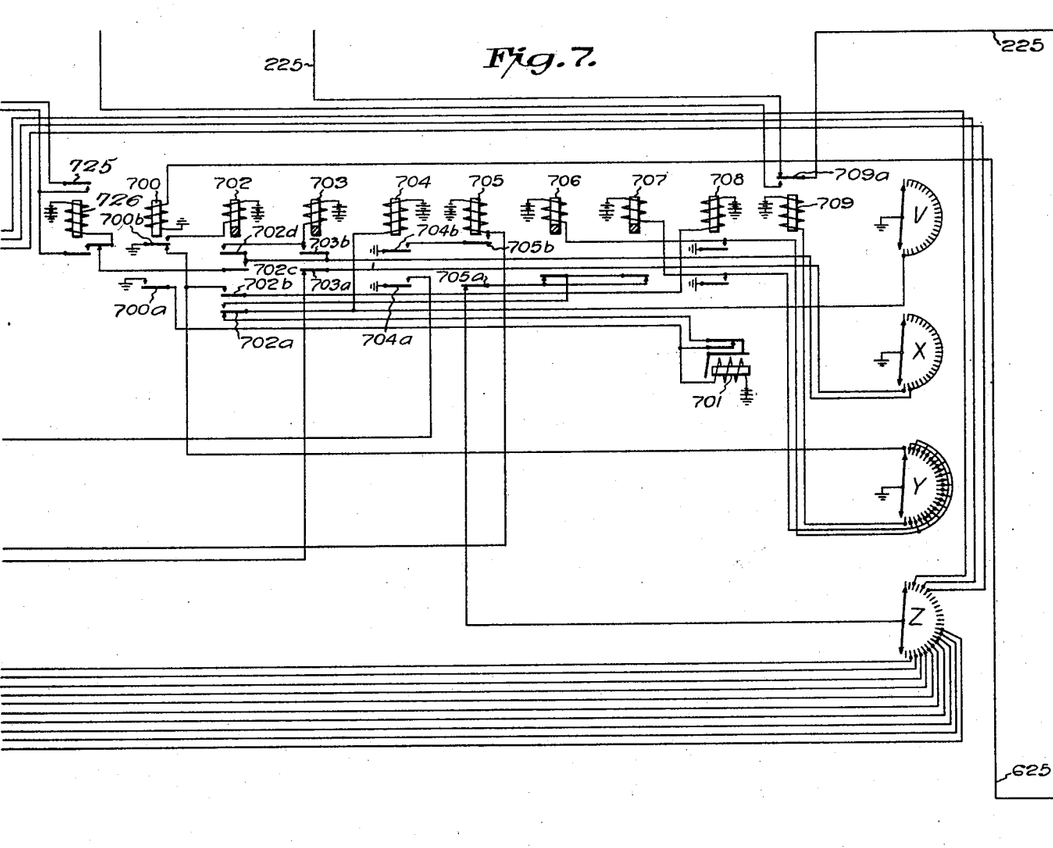
Figure 8:
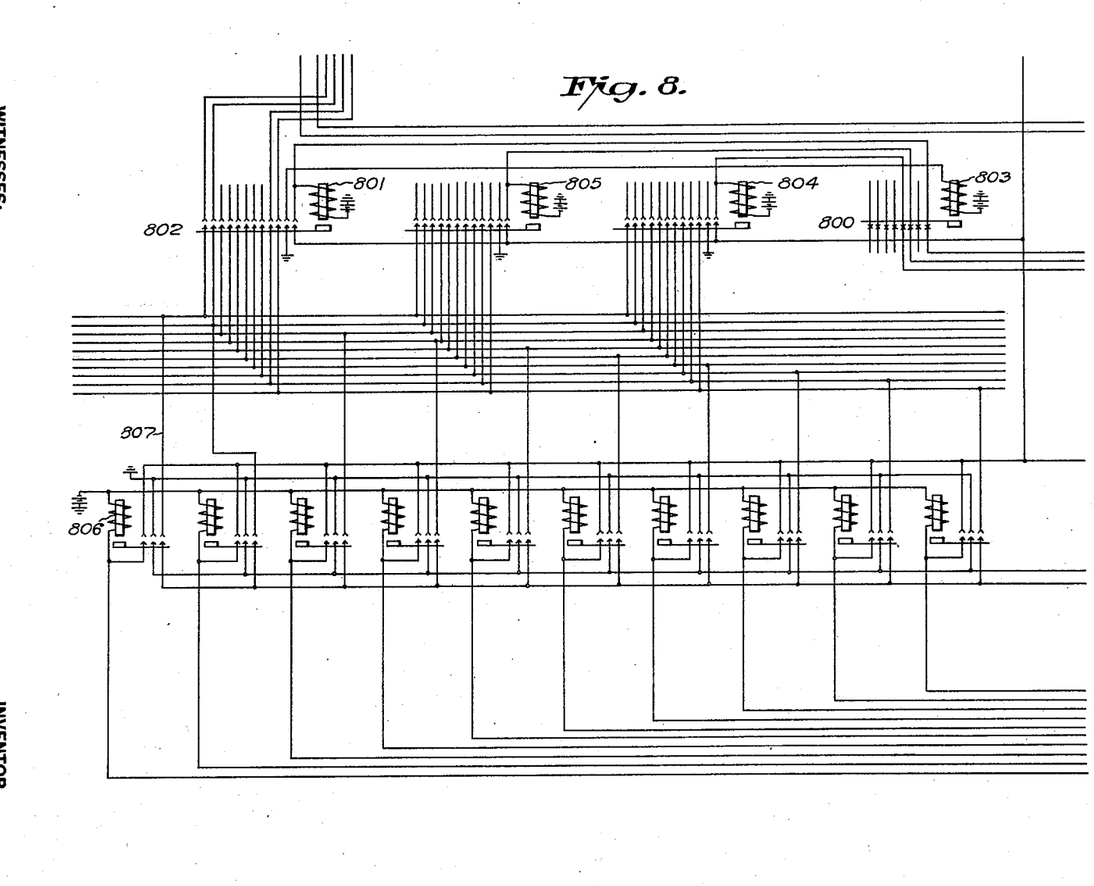

When the wiper of bank E, Fig. 2 reaches the 25th contact, a circuit is completed from battery, through winding of relay 212, its 25th contact and wiper of bank E, to ground.

At its upper armature 212b, ground is removed from the winding 209 so that this relay cannot be energized. At armature 212a, the circuit for the stepping magnet 208 is opened at the lower contact but closed over its upper contact over the armature 216b, which is at this time energized. The stepping magnet 208 is energized preparatory to moving the wipers a to d another step.

As a further result of the movement of the wipers E to H to their 25th contact, the circuit of the relay 214 is opened. The armature of relay 214 is of a vibrating reed type, so that upon the de-energization of relay 214 it will vibrate for a period of time between its front and back contact, thus holding the slow-to-release relays 215 and 216 energized for a considerable time after the de-energization of relay 214.

After an interval, the armature stops midway between its contacts and after a further interval of time, relay 215 is de-energized. De-energization of relay 215 opens the circuit for the relay 216, which, after an interval of time is de-energized. The de-energization of relay 216 opens the circuit for the stepping magnet 208 at its armature 216b and closes the circuit for the relay 220 at its armature 216a. De-energization of stepping magnet 208 steps the wipers A to D from the 2nd to the 3d contact. By this means, a second transmission of the operating code after operation of the apparatus unit is prevented. The code can now be transmitted a second time by again closing the proper individual key.

Energization of relay 220 closes an energizing circuit for the stepping magnet 218 over armature 220c, winding of stepping magnet 218, armature 220a, wiper of bank H, contact of the stepping magnet 218 to battery. Energization of the stepping magnet opens its own circuit at its own contact and the wipers are stepped to the first contact, at which point the circuit for the stepping magnet is opened at the bank H.

The opening of the locking circuit for the relay 5, previously described, also opens the circuit for the relay 210 at its armature 5a. Relay 212 is de-energized when the wiper E moves from the 25th to the 1st contact.

When the wiper Y reaches its 25th contact, relay 709 is energized over the bank Y. At the supervisory sender, relay 611 is energized when the bank R reaches the 25th contact, the result of which is to energize relay 613 over armature 611c. The simultaneous energization of relays 212, 709, 613, and 611 will complete a circuit from battery through armature 611b, winding of relay 612, armature of relay 613 energized, armature of relay 709 and armature 212b, to ground (Fig. 2).

The energization of relay 612 closes an energizing circuit extending from battery, winding of relay 504 to contact 2, bank M, armature 615c and armature 611a, to ground. As a result, relay 504 is energized to energize relay 503 over a circuit from battery, winding of relay 503 and 504 in series, armature 505a and armature 506b, to ground. The circuit for relay 506 remains closed over armature 503d. The supervisory equipment 504 and 503 are thus restored to normal at the 25th impulse.

A detailed description has been given of the operations which take place following the closing of the master key and individual operating key when the switches operate in synchronism. A description will now be given of the operations which take place, first, when the control transmitter and receiver switches do not operate in synchronism, and second, when the supervisory transmitter and receiver switches do not operate in synchronism. It will first be assumed that the switches E to H and I to L have fallen out of step. Under such conditions, when the switches I to L reach their 25th contact, the switches E to H will either be ahead or behind. In either case, no pause will occur at this time. The energized relay 303 will, therefore, not have sufficient time to deenergize and permit its armature 303a to close its back contact. As a result, no operation will take place and the switches I to L will step to their first contact.

At the office, the operations for restoring the apparatus to normal will occur in the above described manner, with the exception that the relay 212, normally energized by the first supervisory signal received, will be de-energized. The master control key still being closed under the above assumption at this time, the same condition now exists as described in detail above in connection with the beginning of the operations. A circuit is completed for the stepping magnet 208 over the armatures 212a, 211b, 210b, and 209a, conductor 7, armature 5b, conductor 6, and armatures 3a and 2a to ground. The energized stepping magnet 208 prepares its pawl for stepping the wipers A to D and simultaneously completes an energizing circuit for the relays 209. The relay 209 and the stepping magnet 208 operate alternately, each controlling the circuit of the other, until the wipers A to D again reach the second contact, at which point a circuit is completed for the relay 211, as described in detail above. The code sender switches E to H now operate in a manner above described for transmitting a code. These operations will be repeated until the switches C to H and I to L step around in synchronism to perform the operation, as described in detail above. The first supervisory signal received at the office over the switches V to Z will then energize the relay 704 which, in turn, will complete an energizing circuit for the relay 212 for stopping the transmission of control of a control code.

If the supervisory code sending switches R to U and the receiving supervisory receiver switches V to Z fall out of step, no pause will occur when the switches V to Z reach their 25th contact and, as a result, the energized relay 703 will not have an opportunity to deenergize for completing the supervisory circuit. Similarly, the relays 709 and 611, each of which normally energize over the 25th contact of their respective switch banks, will not energize simultaneously, so that no circuit will be completed for the relay 612. Since, as described in detail above, the individual equipment for the operated circuit is restored to normal upon the energization of relay 612, the supervisory equpiment will not be restored. The individual equipment will, therefore, remain in its operating condition for transmitting a supervisory code. The supervisory code sending switches R to U will, therefore, repeat their operations, transmitting a code individual to the operated unit. This code will be repeated until the switches R to U and V to Z operate in synchronism when the relays 611 and 709 will energize simultaneously to, in turn, complete an energizing circuit for the relay 612. The energization of the relay 612 will complete an energizing circuit, for the relay 504, as has been described in detail above, which, in turn, will restore the individual equipment to normal and the sending of supervisory signals will stop.

Attention is called at this time to the important distinction between the manner of repeating the supervisory and control codes. In the case of control codes, code impulses are repeatedly transmitted until a supervisory signal is received back at the office to indicate that an operation has taken place. A distinct problem arises, however, in the case of repeatedly transmitting the supervisory code for no means is available for transmitting back an indication to the substation to indicate the correct receipt of the supervisory signal at the office. By special circuit arrangements, however, provision has been made for employing the control code line to check the synchronism of the supervisory switches. These circuits are so arranged that, although no impulse is transmitted back to the substation, nevertheless, supervisory signals are repeatedly transmitted until correct supervision takes place.

If, for any reason, the dispatcher, during the transmission of any code, changes his mind and no longer desires the operation of a particular equipment, or if the operation started was accidental all operations can be stopped by opening the master control key. Opening the master control key will remove potential from the point between relays 2 and 3. These relays will now be energized in series over a circuit from battery, windings of relays 3 and 2, armature 2b, armature of relay 4 de-energized, to ground. As a result of the energization of relay 3, the operating circuit is opened at contact 3a. The energizing circuit for relay 5 is thus opened, which, in turn, will open the circuit for the relay 211 or 210, as the case may be, which, in turn, opens the circuit for the relay 214 at its armature. With the relay 214 deenergized, relays 215 and 216 remain deenergized. With relay 215 deenergized, no circuit can be completed for the code transmitting relay 219, the circuit of which is completed over the armature 213. With the relay 216 deenergized, the relay 220 remains energized and, as a result, the stepping circuit for the relay 218 is maintained open. If the opening of the master key takes place before the control code transmitter is started into operation, no code will be transmitted at all. If, on the other hand, the opening of the master key takes place after some of the control code impulses have been transmitted, the relay 214 will deenergize in the manner described in detail above to, in turn, deenergize the relays 215 and 216, and transmitting operations will stop. The stepping magnet 218 will operate, periodically opening its own circuit to step the switches E to H to normal. This circuit is completed from ground through battery over the contact of the stepping magnet 218, the wiper of switch H, armature 220a and its front contact, winding of stepping magnet 218, and front contact and armature 220—C to ground. In this manner, opening the master key during any period of the control operations will prevent any operation from taking place. This is a safeguard against false operation, should the dispatcher, for some reason open the key during operation.

By means of the arrangement of the line circuits if line 225 accidentally grounds no false operation of relay 300 takes place as is apparent. Similarly if line 625 is grounded, relay 700 is not energized. There is also no effect if lines 225 and 625 cross. In this way no false impulsing can occur.

Since the relays 300 and 700 are both connected to ground, the grounding of the conductors 225 and 625, respectively, will not complete energizing circuits for these relays and, therefore, no false operation will take place. Furthermore, if the conductors 225 and 625 should accidently cross during the non-operating periods, obviously no circuit can be completed for either the relay 700 or 300, since no battery is normally connected in the circuit.

It is obvious that the invention disclosed is applicable to systems other than that disclosed. The selector arrangement is useful in any system where selection is necessary as in telegraphy, telephony, lighting systems, railway signaling and numerous other systems. The particular disclosure illustrates one only of its numerous applications and applicant is not therefore to be considered as restricted thereto.

I claim as my invention:

1. In a supervisory control system, a first station, a second station, apparatus units at said second station, signaling devices individual thereto at said first station, a control line connecting said stations, means including said control line for selectively operating one of said apparatus units from said first station, a rotating supervisory code sender for transmitting code combination of impulses responsive to the operation of said apparatus units, a rotating supervisory code receiver for distributing said received code combination of impulses, and means including said control line directly controlled by said sender and receiver for checking the synchronism of said supervisory sender and receiver.

2. In a supervisory control system, a first station, a second station, apparatus units at said second station, signaling devices individual thereto at said first station, a control line connecting said stations, means including said control line for selectively operating said apparatus units from said first station, a rotating code sender at said second station for transmitting code combination of impulses individual to said apparatus units and their operation, a supervisory code receiver for distributing said received code combination of impulses, means including said arrangement for continuously operating said transmitter and receiver while out of synchronism and means including said control line directly controlled by said sender and receiver for stopping said transmitter after a complete cycle of synchronous operation.

3. In a signaling system, a first station, a second station, apparatus units at said second station, operating means and signaling devices individual to said apparatus unit at said first station, a code transmitter, means responsive to the operation of any one of said apparatus units for transmitting code combinations of impulses over said signaling line in accordance with the operating means operated, means at said second station responsive to the code combination of impulses for operating one of said apparatus units, a rotating code transmitter at said second station started into operation in response to the operation of said apparatus unit, a supervisory line connecting said stations, a supervisory receiver at said first station operated in synchronism with said code transmitter at said second station, means including said supervisory line controlled by said code transmitter for transmitting code combinations of impulses in accordance with the unit operated, said code receiver being responsive to said code combinations of impulses for selecting one of said signaling devices individual to said operated unit, and means operative following the transmission of said code directly controlled by said supervisory code transmitter and receiver and including said control line for checking the synchronism thereof.

4. In a signaling system, a first station, a second station, a plurality of apparatus units at said second station, signaling devices individual thereto at said first station, a signaling line connecting said stations having a normal and check connection at each station, means for transmitting code combinations of impulses over said signaling line, means at said second station responsive to said code for selectively operating one of said apparatus units, a rotating code transmitter at said second station, a rotating code receiver at said first station, a second line connecting said stations, means responsive to the operation of said apparatus units for operating said code transmitter and code receiver, means including said code transmitter and code receiver for selectively operating one of said signaling devices individunal to said operated apparatus unit, electro-magnetic means controlled by said code transmitter for switching said first line to its alternate check position, electro-magnetic means controlled by said code receiver for switching said first line to its alternate check position, means whereby if said control line is switched simultaneously by said code transmitter and said code receiver to its check position for transmitting a check impulse, and means responsive to said check impulse for opera ing said signaling device and for restoring said apparatus to normal.

In testimony whereof I have hereunto subscribed my name this 21st day of October, 1925.

THOMAS U. WHITE.